US009973587B2

(12) United States Patent
Gao et al.

(10) Patent No.: US 9,973,587 B2
(45) Date of Patent: May 15, 2018

(54) WEB PAGE PUSHING METHOD AND APPARATUS, AND TERMINAL

(71) Applicant: Huawei Technologies Co., Ltd., Shenzhen (CN)

(72) Inventors: Jinrong Gao, Xi'an (CN); Kaibing Zhang, Xi'an (CN); Xinchao Shui, Xi'an (CN); Junbo Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 14/832,100

(22) Filed: Aug. 21, 2015

(65) Prior Publication Data

US 2015/0381749 A1    Dec. 31, 2015

Related U.S. Application Data

(63) Continuation of application No. PCT/CN2014/081244, filed on Jun. 30, 2014.

(51) Int. Cl.
G06F 15/16 (2006.01)
H04L 29/08 (2006.01)

(52) U.S. Cl.
CPC .............. *H04L 67/26* (2013.01); *H04L 67/02* (2013.01); *H04L 67/2823* (2013.01)

(58) Field of Classification Search
USPC ....... 709/203, 225, 238, 219, 202, 206, 217, 709/223, 224, 226, 228, 231, 232; 726/1, (Continued)

(56) References Cited

U.S. PATENT DOCUMENTS 6,661,799 B1 * 12/2003 Molitor ............. H04L 29/12009
370/392
7,404,008 B2 * 7/2008 Takeuchi .......... H04L 29/12066
709/238

(Continued)

FOREIGN PATENT DOCUMENTS

CN    1464425 A    12/2003
CN    101510196 A    8/2009

(Continued)

OTHER PUBLICATIONS

Partial English Translation and Abstract of Chinese Patent Application No. CN103269313, dated Aug. 28, 2015, 2 pages.

(Continued)

*Primary Examiner* — Quang N Nguyen
(74) *Attorney, Agent, or Firm* — Conley Rose, P.C.

(57) ABSTRACT

A web page pushing method and apparatus, and a terminal, where the method includes receiving, by a first terminal, a response packet, which is sent by a network side to the first terminal, for a request packet for visiting a target web page, where the response packet includes an Internet Protocol (IP) address of the target web page, determining whether the first terminal stores the response packet, if the first terminal stores the response packet, forwarding the response packet to a second terminal, if the first terminal does not store the response packet, storing the response packet in the first terminal, and replacing the IP address of the target web page in the response packet with an IP address of a preset web page to obtain a target response packet, and sending the target response packet to the second terminal.

12 Claims, 3 Drawing Sheets

(58) Field of Classification Search
USPC .............................................. 726/3; 370/392
See application file for complete search history.

(56) References Cited

U.S. PATENT DOCUMENTS

| | | | | |
|---|---|---|---|---|
| 8,499,034 | B2* | 7/2013 | Karasaridis | H04L 61/1511 709/203 |
| 8,533,780 | B2* | 9/2013 | Parla | H04L 63/0272 726/3 |
| 8,725,888 | B2* | 5/2014 | Short | H04L 63/08 709/219 |
| 9,178,861 | B2* | 11/2015 | Hulse | H04L 63/101 |
| 9,232,338 | B1* | 1/2016 | Henry | H04W 4/021 |
| 9,313,205 | B2* | 4/2016 | Martini | H04L 63/101 |
| 2009/0183247 | A1 | 7/2009 | Kasper et al. | |
| 2009/0254658 | A1* | 10/2009 | Kamikura | H04L 29/12066 709/225 |
| 2012/0317153 | A1 | 12/2012 | Parthasarathy et al. | |
| 2013/0148500 | A1 | 6/2013 | Sonoda et al. | |
| 2014/0090030 | A1 | 3/2014 | Ong | |
| 2015/0334116 | A1* | 11/2015 | Martini | H04L 61/1511 726/1 |
| 2016/0323409 | A1* | 11/2016 | Kolhi | H04L 61/1511 |

FOREIGN PATENT DOCUMENTS

| | | |
|---|---|---|
| CN | 103269313 A | 8/2013 |
| JP | 2002229898 A | 8/2002 |
| JP | 2013522933 A | 6/2013 |

OTHER PUBLICATIONS

Foreign Communication From a Counterpart Application, PCT Application No. PCT/CN2014/081244, International Search Report dated Mar. 31, 2015, 7 pages.

Foreign Communication From a Counterpart Application, PCT Application No. PCT/CN2014/081244, Written Opinion dated Mar. 31, 2015, 4 pages.

Foreign Communication From a Counterpart Application, European Application No. 14883530.9, Extended European Search Report dated May 12, 2016, 7 pages.

Foreign Communication From a Counterpart Application, Japanese Application No. 2016-530319, Japanese Notice of Allowance dated Dec. 13, 2016, 3 pages.

* cited by examiner

WEB PAGE PUSHING METHOD AND APPARATUS, AND TERMINAL

CROSS-REFERENCE TO RELATED APPLICATIONS

This application is a continuation of International Application No. PCT/CN2014/081244, filed on Jun. 30, 2014, which is hereby incorporated by reference in its entirety.

TECHNICAL FIELD

The present disclosure relates to the field of mobile communications, and in particular, to a web page pushing method and apparatus, and a terminal.

BACKGROUND

Currently, an operator has increasingly more requirements for a captive portal, especially in a Wi-Fi terminal product, and a specific requirement may include the following. An operator requires that a portal site of the operator can be popped up after startup by a user, and then the user can surf the Internet normally; or after a user is in arrearage, a page, such as a recharge page or an arrearage reminder, is pushed to the user.

A second terminal receives an Internet access instruction, where the instruction may be a uniform resource locator (URL) address, for example, www.baidu.com; a Hypertext Transfer Protocol (http) request is sent to a network side according to the Internet access instruction; the network side returns a response packet to a first terminal; and the first terminal encapsulates the foregoing response packet into a captive portal packet customized by an operator, and sends the captive portal packet customized by the operator to the second terminal, so that the second terminal displays a captive portal page customized by the operator. However, when the second terminal runs an application and sends an http request to the first terminal, the first terminal cannot discriminate that the foregoing request is sent when the first terminal runs an application, thereby causing a problem that the second terminal cannot normally run the application and cannot display a captive portal page customized by an operator because a response packet that is returned for an http request sent to the first terminal when the application is run is mistakenly encapsulated into a captive portal packet customized by the operator, but a response packet that is returned for an http request sent when a browser is opened is not encapsulated.

SUMMARY

Embodiments of the present disclosure provide a web page pushing method and apparatus, and a terminal, which can solve a problem that a second terminal cannot normally run an application and cannot display a captive portal page customized by an operator.

According to a first aspect, a web page pushing method is provided, where the method includes receiving, by a first terminal, a response packet, which is sent by a network side to the first terminal, for a request packet for visiting a target web page, where the response packet includes an Internet Protocol (IP) address of the target web page, determining whether the first terminal stores the response packet, forwarding the response packet to a second terminal, if the first terminal does not store the response packet, storing the response packet in the first terminal, and replacing the IP address of the target web page in the response packet with an IP address of a preset web page to obtain a target response packet, and sending the target response packet to the second terminal, so that the second terminal displays the preset web page according to the target response packet.

With reference to the first aspect, in a first implementation manner of the first aspect, before the receiving, by a first terminal, a response packet, which is sent by a network side to the first terminal, for a request packet for visiting a target web, the method further includes sending, by the first terminal, the request packet for visiting the target web page to the network side, where the request packet includes a URL address of the target web page, so that the network side acquires and returns the IP address of the target web page according to the URL address, and receiving the response packet returned by the network side, where the response packet includes the IP address of the target web page.

With reference to the first aspect or the first implementation manner of the first aspect, in a second implementation manner of the first aspect, the response packet further includes an address of the second terminal and a source port address of the request packet for visiting the target web page.

According to a second aspect, a web page pushing apparatus is provided, where the apparatus includes a receiving unit, a determining unit, a forwarding unit, a replacing unit, and a sending unit, where the receiving unit is configured to receive a response packet, which is sent by a network side to a first terminal, for a request packet for visiting a target web page, where the response packet includes an IP address of the target web page, the determining unit is configured to determine whether the first terminal stores the response packet received by the receiving unit, the forwarding unit is configured to, when the determining unit determines that the first terminal stores the response packet, forward the response packet to a second terminal, the replacing unit is configured to, when the determining unit determines that the first terminal does not store the response packet, store the response packet in the first terminal, and replace the IP address of the target web page in the response packet with an IP address of a preset web page to obtain a target response packet, and the sending unit is configured to send the target response packet obtained by the replacing unit to the second terminal, so that the second terminal displays the preset web page according to the target response packet.

With reference to the second aspect, in a first implementation manner of the second aspect, the sending unit is further configured to send the request packet for visiting the target web page to the network side, where the request packet includes a URL address of the target web page, so that the network side acquires and returns the IP address of the target web page according to the URL address, and the receiving unit is further configured to receive the response packet returned by the network side, where the response packet includes the IP address of the target web page.

With reference to the second aspect or the first implementation manner of the second aspect, in a second implementation manner of the second aspect, the response packet further includes an address of the second terminal and a source port address of the request packet for visiting the target web page.

According to a third aspect, a terminal is provided, where the terminal includes a network interface, one or more processors, and a memory, where one or more programs are stored in the memory and are configured to be executed by the one or more processors, where the one or more programs include receiving a response packet, which is sent by a network side to the terminal, for a request packet for visiting a target web page, where the response packet includes an IP address of the target web page, determining whether the terminal stores the response packet, if the terminal stores the response packet, forwarding the response packet to a second terminal, if the terminal does not store the response packet, storing the response packet in the terminal, and replacing the IP address of the target web page in the response packet with an IP address of a preset web page to obtain a target response packet, and sending the target response packet to the second terminal, so that the second terminal displays the preset web page according to the target response packet.

With reference to the third aspect, in a first implementation manner of the third aspect, the one or more programs further include sending the request packet for visiting the target web page to the network side, where the request packet includes a URL address of the target web page, so that the network side acquires and returns the IP address of the target web page according to the URL address, and receiving the response packet returned by the network side, where the response packet includes the IP address of the target web page.

With reference to the third aspect or the first implementation manner of the third aspect, in a second implementation manner of the third aspect, the response packet further includes an address of the second terminal and a source port address of the request packet for visiting the target web page.

According to the web page pushing method and apparatus, and the terminal that are provided in the embodiments of the present disclosure, a received response packet is compared with a response packet stored in a first terminal, an IP address of a target web page in a response packet in which inconsistency exists by means of comparison is modified to obtain a target response packet, and the obtained target response packet is sent to a second terminal, so that the second terminal can normally run an application and can accurately display a preset web page.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

To better understand embodiments of the present disclosure, the following uses specific embodiments to provide further explanation with reference to the accompanying drawings, and the embodiments constitute no limitation on the embodiments of the present disclosure.

Figure 1:
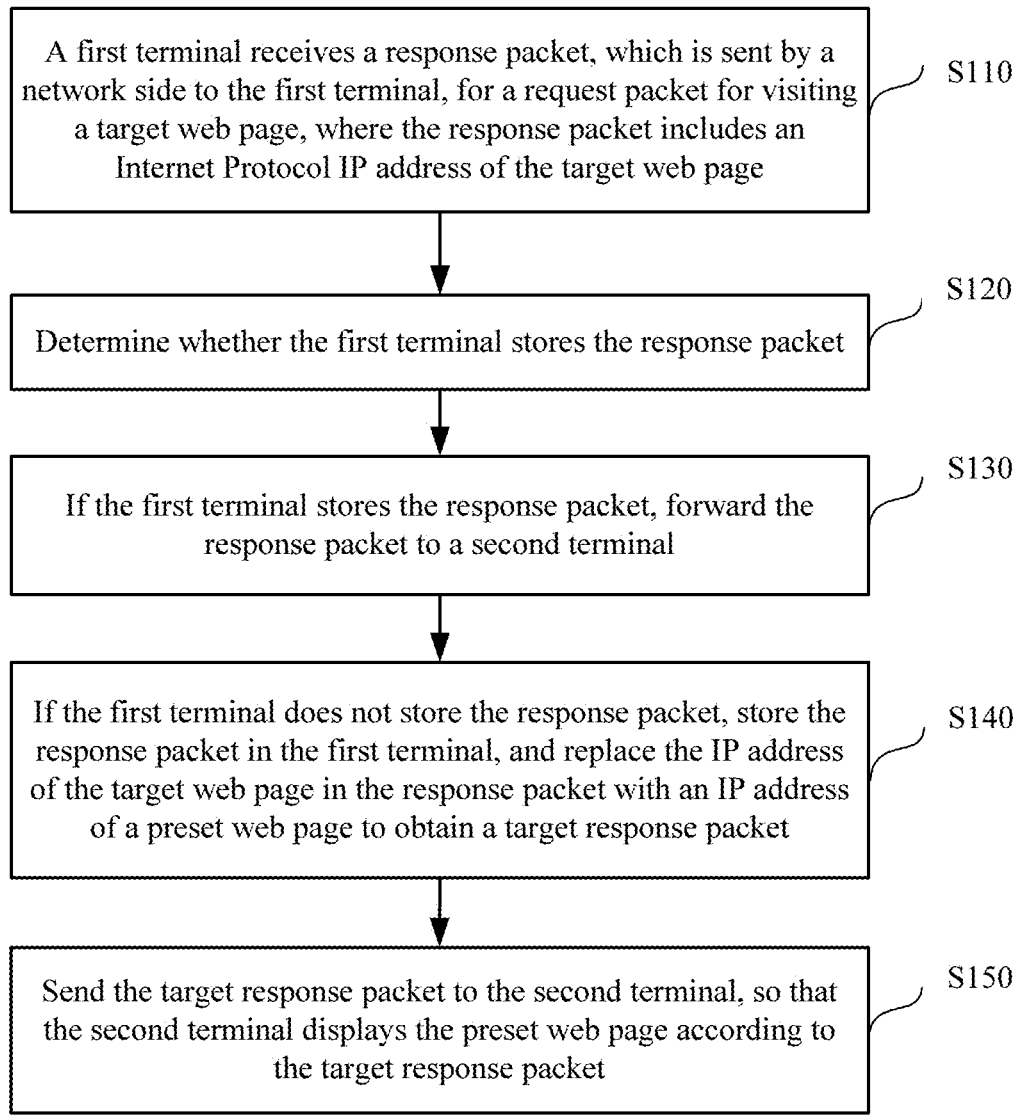
FIG. 1 is a flowchart of a web page pushing method according to Embodiment 1 of the present disclosure.

FIG. 1 is a flowchart of a web page pushing method according to Embodiment 1 of the present disclosure. As shown in FIG. 1, the method includes the following step S110. A first terminal receives a response packet, which is sent by a network side to the first terminal, for a request packet for visiting a target web page, where the response packet includes an P address of the target web page.

It should be noted that, the first terminal has a WIFI connection function, for example, may be a customer premises equipment (CPE) or a home gateway with a WIFI connection function; a second terminal has a WIFI connection function, for example, may be a mobile terminal with a WIFI connection function, such as a mobile phone, a tablet computer, and a notebook computer, or may be a fixed terminal with a WIFI connection function, such as a desktop computer or a server. In addition, a browser and an application are installed on the second terminal.

Figure 2:
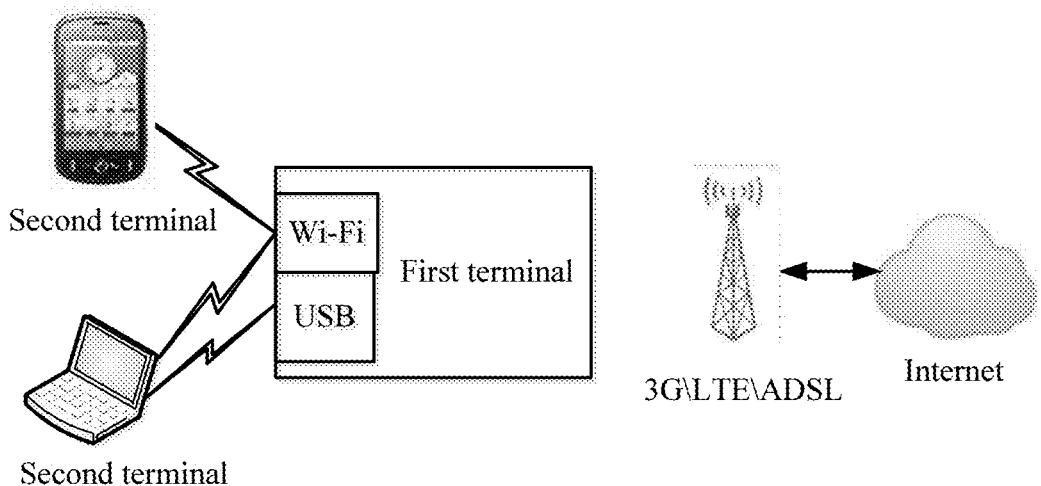
FIG. 2 is a working principle diagram of a first terminal.

Referring to a working principle diagram of a first terminal shown in FIG. 2, the first terminal and a second terminal each enable a Wi-Fi function, and the second terminal has been successfully connected to the first terminal. When the second terminal receives an instruction for opening a browser or an application, where the instruction includes but is not limited to a URL address of a target web page, the target web page is a home page of a website visited by the second terminal; when the website visited by the second terminal is Baidu, the foregoing URL address of the target web page is www.baidu.com; and after receiving the foregoing instruction, the second terminal sends a request packet for visiting the target web page to the first terminal, where the request packet includes but is not limited to the foregoing URL address of the target web page. After receiving the foregoing request packet for visiting the target web page, the first terminal sends the request packet to a network side, and the network side acquires and returns an IP address of the target web page according to the URL address in the received request packet. The first terminal receives a response packet returned by the network side, where the response packet includes the IP address of the target web page.

It should be noted that, the network side may include a domain name server (DNS), where the DNS server is configured to resolve a received URL address, so as to obtain an IP address corresponding to the URL address. For example, after the DNS server resolves a received URL address of Baidu www.baidu.com, an IP address of Baidu 202.108.22.5 can be obtained.

Optionally, after the network side acquires and returns the IP address of the target web page according to the URL address in the received request packet and before the first terminal receives the response packet returned by the network side, the method may further include reassembling, by the first terminal, the foregoing request packet according to the received IP address of the target web page, that is, replacing the URL address of the target web page in the request packet with the IP address of the target web page, so as to generate an http request packet, where the http request packet includes but is not limited to, a source port address of the request packet of the target web page, an address of the second terminal, and the IP address of the target web page; and sending the http request packet to the network side.

After receiving the http request packet sent by the first terminal, the network side returns a response packet for the foregoing http request packet to the first terminal, where the response packet includes the source port address of the request packet of the target web page, the address of the second terminal, and the IP address of the target web page.

It may be understood that, when the second terminal is a mobile terminal, an address of the second terminal may be an international mobile equipment identification number (IMEI) of the second terminal.

S120. Determine whether the first terminal stores the response packet.

It should be noted that, the first terminal may store the response packet in a table, or may store the foregoing response packet in a queue or another storage area in which data can be temporarily stored.

It should be noted herein that, when the first terminal has not received the response packet, the first packet does not store any content. When the first terminal receives the response packet, it is determined, according to the IP address of the target web page, the address of the second terminal, and the source port address of the request packet of the target web page, whether the first terminal stores the response packet.

S130. If the first terminal stores the response packet, forward the response packet to a second terminal.

S140. If the first terminal does not store the response packet, store the response packet in the first terminal, and replace the IP address of the target web page in the response packet with an IP address of a preset web page to obtain a target response packet.

It may be understood that, after the second terminal starts, the second terminal receives a first instruction for opening a browser, or receives a first instruction for opening an application; and when a first http request packet is sent to the network side through the first terminal, the first terminal returns a first response packet according to the first http request packet. Because what the network side returns is the first response packet, it is determined that the first terminal does not store the response packet, and then the response packet is stored in the first terminal. The source port address of the request packet of the target web page, the address of the second terminal, and the IP address of the target web page are stored in the first terminal.

It should be noted herein that, the preset web page may be a captive portal page customized by an operator. For example, when the operator is China Mobile, the foregoing preset web page may be a home page of China Mobile. In addition, after the second terminal is in arrearage, the foregoing preset web page may be a page pushed to the second terminal, such as a recharge page or an arrearage reminder.

A routing protocol stack of the first terminal replaces the IP address of the target web page in the foregoing first response packet with the IP address of the preset web page to obtain the target response packet.

For a response packet received by the first terminal except the first response packet, if the first terminal stores the response packet, the response packet is forwarded to the second terminal; otherwise, same processing for the first response packet is performed on the response packet except the first response packet. The foregoing step of determining, each time when a response packet is received, whether the first terminal stores the response packet may avoid that a same response packet is consecutively modified for multiple times, which causes that the second terminal cannot normally visit a target web page and user experience is affected.

S150. Send the target response packet to the second terminal, so that the second terminal displays the preset web page according to the target response packet.

It should be noted that, if the second terminal sends, when receiving an instruction for opening an application, the request packet for visiting the target web page to the first terminal, because the IP address in the target response packet is the IP address of the preset web page, the application identifies the foregoing received target response packet as a wrong response packet, that is, the second terminal fails to open the foregoing application. Afterwards, if the second terminal sends, when receiving an instruction for opening the application again, the request packet for visiting the target web page to the first terminal, a http request packet generated by the first terminal is consistent with a http request packet generated by the first terminal for the first time, and therefore returned response packets are also consistent. Therefore, it can be determined that the first terminal has stored the response packet, and the first terminal forwards the response packet to the second terminal, so that the second terminal can normally open the application.

If the second terminal sends, when receiving an instruction for opening a browser, the request packet for visiting the target web page to the first terminal, the IP address in the target response packet has been replaced with the IP address of the preset web page, and therefore, the browser can display the preset web page, such as the home page of China Mobile, according to the foregoing target response packet. After displaying the preset web page, the second terminal sends an instruction message to the first terminal, where the instruction message is used to instruct the first terminal no longer to modify the IP address in the response packet when receiving the response packet, so that the second terminal can normally visit the target web page, That is, a purpose that visiting the target web page by the second terminal is not affected is achieved in a case in which a captive portal page customized by an operator is displayed.

In an embodiment, a first terminal may preset a function of a captive portal and enable the function. When the function of the captive portal is enabled, the first terminal performs operations, such as determining and IP address modification, on a received response packet until the foregoing instruction message is received, where the instruction message may be an instruction for disabling the function of the captive portal. When receiving the foregoing instruction message, a network device side disables the function of the captive portal, that is, no longer modifies an IP address in the response packet.

In conclusion, according to the web page pushing method provided in this embodiment of the present disclosure, a received response packet is compared with a response packet stored in a first terminal, an IP address of a target web page in a response packet in which inconsistency exists by means of comparison is modified to an IP address of a preset web page to obtain a target response packet, and the obtained target response packet is sent to a second terminal, so that on the premise that the second terminal accurately displays the preset web page, normally opening a browser by the second terminal to visit the target web page is not affected, or normally opening an application by the second terminal is not affected.

Figure 3:
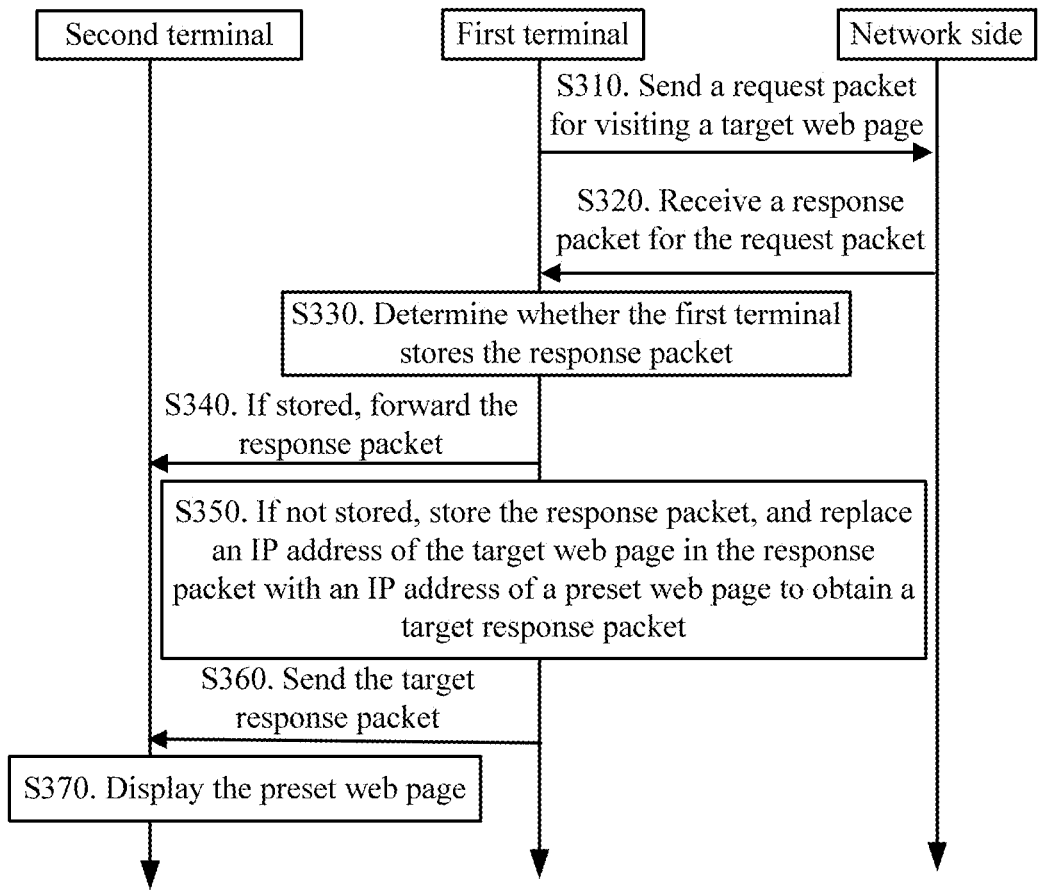
FIG. 3 is an information interaction diagram of a web page pushing method according to Embodiment 2 of the present disclosure.

FIG. 3 is an information interaction diagram of a web page pushing method according to Embodiment 2 of the present disclosure. As shown in FIG. 3, the method includes the following step S310. A first terminal sends a request packet for visiting a target web page.

S320. The first terminal receives a response packet for the request packet.

S330. Determine whether the first terminal stores the response packet.

S340. If stored, forward the response packet to a second terminal.

S350. If not stored, store the response packet, and replace an IP address of the target web page in the response packet with an IP address of a preset web page to obtain a target response packet.

S360. The first terminal sends the target response packet to the second terminal.

S370. The second terminal displays the preset web page.

Figure 4:
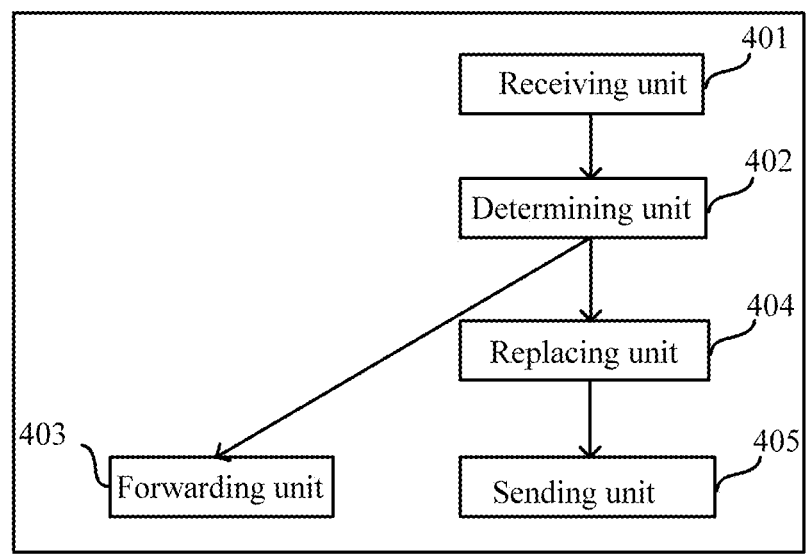
FIG. 4 is a schematic diagram of a web page pushing apparatus according to Embodiment 3 of the present disclosure.

FIG. 4 is a schematic diagram of a web page pushing apparatus according to Embodiment 3 of the present disclosure. The apparatus may be configured to execute the method shown in FIG. 1. In FIG. 4, the apparatus includes a receiving unit 401, a determining unit 402, a forwarding unit 403, a replacing unit 404, and a sending unit 405.

The receiving unit 401 is configured to receive a response packet, which is sent by a network side to a first terminal, for a request packet for visiting a target web page, where the response packet includes an IP address of the target web page.

The determining unit 402 is configured to determine whether the first terminal stores the response packet received by the receiving unit 401.

The forwarding unit 403 is configured to, when the determining unit 402 determines that the first terminal stores the response packet, forward the response packet to a second terminal.

The replacing unit 404 is configured to, when the determining unit 402 determines that the first terminal does not store the response packet, store the response packet in the first terminal, and replace the IP address of the target web page in the response packet with an IP address of a preset web page to obtain a target response packet.

The sending unit 405 is configured to send the target response packet obtained by the replacing unit 404 to the second terminal, so that the second terminal displays the preset web page according to the target response packet.

Optionally, the sending unit 405 is further configured to send the request packet for visiting the target web page to the network side, where the request packet includes a URL address of the target web page, so that the network side acquires and returns the IP address of the target web page according to the URL address, and the receiving unit 401 is further configured to receive the response packet returned by the network side, where the response packet includes the IP address of the target web page.

Optionally, the response packet further includes an address of the second terminal and a source port address of the request packet for visiting the target web page.

According to the web page pushing apparatus provided in this embodiment of the present disclosure, a received response packet is compared with a response packet stored in a first terminal, an IP address of a target web page in a response packet in which inconsistency exists by means of comparison is modified to obtain a target response packet, and the obtained target response packet is sent to a second terminal, so that a browser of the second terminal can accurately display a preset web page.

Figure 5:
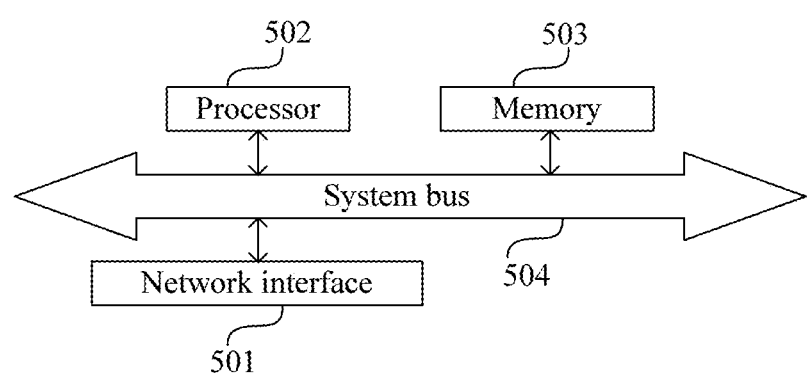
FIG. 5 is a schematic diagram of a terminal according to Embodiment 4 of the present disclosure.

FIG. 5 is a schematic diagram of a terminal according to Embodiment 4 of the present disclosure. As shown in FIG. 5, the terminal includes a network interface 501, a processor 502, and a memory 503. A system bus 504 is configured to connect the network interface 501, the processor 502, and the memory 503.

The network interface 501 is configured to communicate with another device.

For example, the processor 502 may be a central processing unit (CPU).

The memory 503 may be a permanent memory, for example, a hard disk drive or a flash memory; and one or more programs are stored in the memory 503 and are configured to be executed by one or more processors 502, where the one or more programs include receiving a response packet, which is sent by a network side to the first terminal, for a request packet for visiting a target web page, where the response packet includes an IP address of the target web page, determining whether the first terminal stores the response packet, if the first terminal stores the response packet, forwarding the response packet to a second terminal, if the first terminal does not store the response packet, storing the response packet in the first terminal, and replacing the IP address of the target web page in the response packet with an IP address of a preset web page to obtain a target response packet, and sending the target response packet to the second terminal, so that the second terminal displays the preset web page according to the target response packet.

Further, the one or more programs further include: sending the request packet for visiting the target web page to the network side, where the request packet includes a URL address of the target web page, so that the network side acquires and returns the IP address of the target web page according to the URL address, and receiving the response packet returned by the network side, where the response packet includes the IP address of the target web page.

Optionally, the response packet further includes an address of the second terminal and a source port address of the request packet of the target web page.

According to the terminal provided in this embodiment of the present disclosure, a received response packet is compared with a response packet stored in a first terminal, an IP address of a target web page in a response packet in which inconsistency exists by means of comparison is modified to obtain a target response packet, and the obtained target response packet is sent to a second terminal, so that a browser of the second terminal can accurately display a preset web page.

A person skilled in the art may be further aware that, in combination with the examples described in the embodiments disclosed in this specification, units and algorithm steps can be implemented by electronic hardware, computer software, or a combination thereof. To clearly describe interchangeability between hardware and software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

Steps of methods or algorithms described in the embodiments disclosed in this specification may be implemented by hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable disk, a compact disc (CD)-ROM, or any other form of storage medium known in the art.

In the foregoing specific implementation manners, the objectives, technical solutions, and benefit effects of the present disclosure are described in further detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A web page pushing method comprising:
sending, by a first terminal, a request packet for visiting a target web page to a domain network server (DNS), wherein the request packet comprises a uniform resource locator (URL) address of the target web page;
receiving, by the first terminal from the DNS, a response packet for the request packet for visiting the target web page, wherein the response packet comprises an Internet Protocol (IP) address of the target web page;
determining whether the first terminal already stores the response packet;
forwarding the response packet to a second terminal when the first terminal already stores the response packet; and
when the first terminal does not already store the response packet:
storing the response packet in the first terminal;
replacing the IP address of the target web page in the response packet with an IP address of a preset web page to obtain a target response packet, wherein the preset web page is different than the target web page; and
sending the target response packet to the second terminal instead of sending the response packet to the second terminal.

2. The method according to claim 1, wherein the response packet further comprises:
an address of the second terminal; and
a source port address of the request packet of the target web page.

3. The method according to claim 1, wherein the response packet further comprises:
an address of the second terminal; and
a source port address of the request packet of the target web page.

4. The method according to claim 3, wherein the first terminal determines whether the first terminal stores the response packet based on the IP address of the target web page, the address of the second terminal, and the source port address of the request packet for visiting the target web page.

5. The method according to claim 1, wherein the preset web page is a captive portal page.

6. A first terminal comprising:
a network interface;
one or more processors coupled to the network interface; and
a memory coupled to the one or more processors, wherein one or more programs are stored in the memory and are configured to be executed by the one or more processors and cause the one or more processors to:
send, via the network interface, a request packet for visiting a target web page to a domain network server (DNS), wherein the request packet comprises a uniform resource locator (URL) address of the target web page;
receive, via the network interface from the DNS, a response packet for the request packet for visiting the target web page, wherein the response packet comprises an Internet Protocol (IP) address of the target web page;
determine whether the first terminal already stores the response packet;
forward the response packet to a second terminal when the first terminal already stores the response packet; and
when the first terminal does not already store the response packet:
store the response packet in the memory;
replace the IP address of the target web page in the response packet with an IP address of a preset web page to obtain a target response packet, wherein the preset web page is different than the target web page; and
send, via the network interface, the target response packet to the second terminal.

7. The first terminal according to claim 6, wherein the response packet further comprises:
an address of the second terminal; and
a source port address of the request packet for visiting the target web page.

8. The first terminal according to claim 6, wherein the response packet further comprises:
an address of the second terminal; and
a source port address of the request packet for visiting the target web page.

9. A web page pushing method comprising:
sending, by a first terminal, a request packet for visiting a target web page to a domain network server (DNS), wherein the request packet comprises a uniform resource locator (URL) address of the target web page;
receiving, by the first terminal, a response packet from the DNS for the request packet for visiting the target web page, wherein the response packet comprises an Internet Protocol (IP) address of the target web page;
determining that the first terminal does not store the response packet;
storing the response packet in the first terminal based on determining that the first terminal does not store the response packet;
replacing the IP address of the target web page in the response packet with an IP address of a preset web page to obtain a target response packet based on determining that the first terminal does not store the response packet, wherein the preset web page is a captive portal page that is different than the target web page; and
causing a second terminal to display the captive portal page instead of the target web page by sending the target response packet to the second terminal instead of the response packet based on determining that the first terminal does not store the response packet.

10. The method according to claim 9, further comprising:
receiving, by the first terminal subsequent to sending the target response packet to the second terminal, a second request packet for visiting the web page;
sending, by the first terminal, the second request packet for visiting the target web page to the DNS;
receiving, by the first terminal, a second response packet from the DNS for the second request packet for visiting the target web page;

determining that the first terminal stores the second response packet; and sending the second response packet to the second terminal based on determining that the first terminal stores the second response packet.

11. The method according to claim 9, wherein the response packet further comprises:

an address of the second terminal; and a source port address of the request packet of the target web page.

12. The method according to claim 9, wherein the first terminal is a customer premises equipment and the second terminal is a mobile phone.

* * * * *